United States Patent [19]

Hanley

[11] Patent Number: 5,034,431
[45] Date of Patent: Jul. 23, 1991

[54] REINFORCED POLYMERS
[75] Inventor: Stephen J. Hanley, Whippany, N.J.
[73] Assignee: Shell Oil Company, Houston, Tex.
[21] Appl. No.: 579,433
[22] Filed: Sep. 6, 1990
[51] Int. Cl.$^5$ ................................................ C08K 9/06
[52] U.S. Cl. .................................. 523/213; 523/214; 523/217; 524/612
[58] Field of Search ........................ 523/213, 214, 217; 524/612

[56] References Cited
U.S. PATENT DOCUMENTS 3,694,412  9/1972  Nozaki ................................... 260/63
4,843,144  6/1989  Van Broekhoven et al. ...... 528/392
4,880,865  11/1989  George ................................. 524/612
4,880,903  11/1989  Van Broekhoven et al. ...... 528/392

Primary Examiner—Paul R. Michl
Assistant Examiner—Edward J. Cain
Attorney, Agent, or Firm—James O. Okorafor

[57] ABSTRACT

Glass fiber reinforced linear alternating polymers of carbon monoxide and at least one ethylenically unsaturated hydrocarbon show good mechanical properties when the glass fiber employed for reinforcement contains a sizing with an aminosilane functional group, and a polymeric film former with polyurethane and epoxy functional groups, and is present in an amount of from about 1 to 45 weight percent of the reinforced fiber.

8 Claims, No Drawings

REINFORCED POLYMERS

FIELD OF THE INVENTION

This invention relates to reinforced, linear alternating polymers of carbon monoxide and at least one ethylenically unsaturated hydrocarbon. More particularly, the invention relates to such polymers reinforced by glass fibers having applied thereto a particular coating or sizing.

BACKGROUND OF THE INVENTION

The class of linear alternating polymers of carbon monoxide and at least one ethylenically unsaturated hydrocarbon is known in the art. An early production was by Nozaki, e.g., U.S. Pat. No. 3,694,412. More recently, this class of linear alternating polymers, now becoming known as polyketones or polyketone polymers, has become of greater interest in part because of the greater availability of the polymers. The more recent processes for the production of such polymers typically involve a catalyst composition formed from a compound of a Group VIII metal selected from palladium, cobalt or nickel, the anion of a strong non-hydrohalogenic acid and a bidentate ligand of phosphorus, arsenic or antimony. These processes are illustrated by Van Broekhoven et al, U.S. Pat. Nos. 4,843,144 and 4,880,903.

The resulting polymers are relatively high molecular weight materials having established utility as premium thermoplastics. The polyketone polymers are processed by methods conventional for thermoplastics such as extrusion, injection molding and thermoforming into a variety of shaped articles such as containers for food and drink and parts and housings for automotive applications. For some particular applications, however, it has been found to be desirable to have properties which are somewhat different from those of the polyketone polymer. It would be of advantage to retain the more desirable properties of the polyketone polymers and yet improve other properties, for example, the tensile strength.

One proposal for obtaining polyketone polymers of greater tensile strength is through the use of an internal reinforcement. A copending U.S. patent application, Ser. No. 289,157, filed Dec. 23, 1988, discloses the production of reinforced polyketone polymers wherein the reinforcement is in the form of glass fibers. The success of glass fibers as a reinforcement depends in part upon the compatibility of the glass with the polymer. The compatibility in turn often depends upon the coating or sizing applied to the glass prior to incorporation into the reinforced polymer. It would be of advantage to provide for glass fiber reinforced polyketone polymers of improved properties by having a particular sizing on the fibers.

SUMMARY OF THE INVENTION

The present invention provides improved, reinforced, linear alternating polymers of carbon monoxide and at least one ethylenically unsaturated hydrocarbon. More particularly, the invention provides such polymers reinforced by glass fibers having a particular aminosilane-type and polyurethane sizing. The reinforced polymers are characterized by a tensile strength higher than that obtained when glass fibers sized with other materials are employed.

DESCRIPTION OF THE INVENTION

The reinforced polymers of the invention are linear alternating polymers of carbon monoxide and at least one ethylenically unsaturated hydrocarbon reinforced by the presence therein of glass fibers having a particular type of coating or sizing. The ethylenically unsaturated hydrocarbons which are suitably employed as precursors of the linear alternating polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene or are arylaliphatic containing an aryl substituent on an otherwise aliphatic molecule, particularly an aryl substituent on a carbon atom of the ethylenic unsaturation. Illustrative of this latter type of ethylenically unsaturated hydrocarbon are styrene, p-methylstyrene, p-ethylstyrene and m-propylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are to be employed in the reinforced polymers of the invention, there will be at least two units incorporating a moiety of ethylene or each unit incorporating a moiety of the second hydrocarbon. Preferably, there will be from about 10 units to about 100 units incorporating a moiety of ethylene for each unit incorporating a moiety of the second hydrocarbon. The polymeric chain of the preferred polyketones is therefore represented by the repeating formula

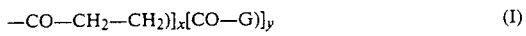

$$-CO-CH_2-CH_2)]_x[CO-G)]_y \qquad (I)$$

wherein G is a moiety of the second ethylenically unsaturated hydrocarbon of at least 3 carbon atoms polymerized through the ethylenic unsaturation thereof and the ratio of y:x is no more than about 0.5. When the preferred copolymers are to be employed there will be no second hydrocarbon present and the copolymers are represented by the above formula I wherein y is zero. When y is other than zero, i.e., terpolymers are employed, the $-CO-CH_2CH_2-$ units and the $-CO-G-$ units are found randomly along the polymer chain and the preferred ratios of y:x are from about 0.01 to about 0.1. The end groups or "caps" of the polymer chain will depend upon what materials were present during the preparation of the polymer and whether and how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000, as determined by gel permeation chromatography. The physical properties of the polymers will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more particularly from about 210° C. to about 270° C. The polymers have a limiting viscosity number (LVN), measured in a standard capillary viscosity measuring device in m-cresol at 60° C., from about 0.5 dl/g to about 10 dl/g, more frequently from about 0.8 dl/g to about 4 dl/g.

The general methods for producing the polyketone polymers are illustrated by the above Van Broekhoven et al patents. The carbon monoxide and ethylenically unsaturated hydrocarbon are contacted in the presence of a catalyst composition preferably formed from a compound of palladium, the anion of a non-hydrohalogenic acid having a pKa, measured in water at 18° C., of below 2 and a bidentate ligand of phosphorus. The scope of the polymerization is extensive but, without wishing to be limited, a preferred palladium compound is a palladium carboxylate such as palladium acetate, the preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in a liquid reaction diluent, preferably an alkanol such as methanol. The carbon monoxide and hydrocarbon reactants, the catalyst composition and the reaction diluent are contacted under polymerization conditions by conventional methods such as shaking or stirring in a suitable reaction vessel. Typical polymerization conditions include a reaction temperature from about 20° C. to about 150° C., preferably from about 50° C. to about 135° C. The reaction pressure is from about 1 atmosphere to about 200 atmospheres but pressures from about 10 atmospheres to about 100 atmospheres are more often encountered. The polyketone polymer product is typically obtained as a material substantially insoluble in the reaction diluent and is recovered by well known procedures such as filtration or decantation. The polyketone is used as recovered or is purified, if desired, as by contact with a solvent or extraction agent which is selective for catalyst residues.

The polymers of the invention are reinforced by the presence therein of glass fiber having a particular type of coating or sizing. The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal or alkaline earth metal silicate glass, particularly a silicate glass illustratively containing one or more of aluminum, calcium, boron and magnesium oxides. Fibers produced of such glass are conventional and are commercially available from a number of U.S. and foreign glass manufacturers. However, the specific dimensions of the glass are of some importance to successful utilization in the reinforced polymers of the invention and of particular importance is the nature of the material used as sizing or coating of the glass.

In the reinforced polymers of the invention, the glass fibers used as reinforcement are chopped glass fibers of circular cross-section. The fibers range in diameter from about 5 microns to about 20 microns, preferably from about 8 microns to about 15 microns. Fibers of greater or lesser diameter are also suitable but fibers of too small a diameter do not provide the required strength and fibers of too large a diameter contribute too much weight for the resulting increase in strength. Although in some applications the presence of long continuous strands of glass may be beneficial, it is preferred in the reinforced polymers of the invention to use short fibers of glass. Lengths of glass fiber from about 0.1 inch to about 0.5 inch are satisfactory. While longer or shorter lengths are also useful, too long a length of glass fiber detracts from the processability of the polymer-glass mixture while too short a length of fiber does not provide the desired strength. It is recognized that the actual length of the glass fibers in the reinforced polymer will depend to some extent upon the method of blending or mixing the polymer and the glass fibers as this process may mechanically reduce the length of the fibers.

The glass fibers which are to be used as reinforcement for plastic materials will have a coating of a material termed a sizing material or sizing agent. Without wishing to be bound by any particular theory, it appears likely that the sizing material serves as a type of "coupling agent" to influence the nature of the interfacial shear strength of the fiber and the polyketone polymer. Expressed differently, the nature of the sizing material will influence the compatibility of the polymer and the glass fiber or how well the polymer and fiber will adhere. For a fiber to contribute strength to a reinforced polymer, the interfacial shear strength will be at least comparable to the shear strength of the polymer so that there will be good adhesion between the polymer and the glass fiber. This interfacial shear strength will be influenced by the polarity of the polymer and a sizing material that works well for one polymer will not necessarily work well with other polymers. Sizings are generally characterized by the general nature of the size rather than by the specific chemical structure which is often proprietary to the glass fiber manufacturer. Moreover, the characterization of the sizing material is often in terms of the types of substituents attached to the terminal portions of a hydrocarbon chain without identifying the specific groups present. Such characterization is well understood in the art. In order to reinforce the linear alternating polymers, glass fibers having a variety of sizings are useful. However, when the fibers are treated with a particular type of sizing material, the reinforced polymers which result have particularly good tensile strength. The sizing agent used for the glass fibers of the invention combine aminosilane moieties in a size of the polyurethane type.

Sizing agents typically contain an organic film former, an organofunctional silane, antistatic agents and lubricants. The silane contains a chain of up to 3 methylene groups with silane functionality on one end and amine functionality on the other. The silane functionality comprises a mono-, di- or triaminosilane group, or mixtures thereof. The sizing agent is applied to the glass surface via an aqueous solution which hydrolyzes the silane and disperses the film former. The hydrolyzed silane group condenses with similar silanol groups on the surface of the glass fiber and the amino functionality reacts with a polymeric film former which contains polyurethane and epoxy functionalities. The sizing agents employed in the reinforced polymers of the invention contain aminosilane, polyurethane and epoxy functionality. This combination serves to distinguish the sizing agents of the invention from other related sizing agents. Fibers coated with such sizing agents are commercially available.

The glass fibers are employed in a quantity of from about 1% by weight to about 45% by weight based on the total reinforced polymer. Quantities of glass fiber from about 10% by weight to about 35% by weight on the same basis are preferred. The method of producing the fiber reinforced polymers is not material so long as an intimate mixture of the components is obtained without undue degradation of the components or the reinforced polymer. The glass fibers are often obtained with the desired sizing already present from the fiber manufacturer. Alternatively, a glass fiber free of sizing agent can be coated with the sizing at the same time that the glass fibers are mixed with the polymer. In one modification the components are dry mixed and converted to a reinforced polymer by application of heat and pressure. In an alternate modification the components are passed through an extruder to obtain the reinforced polymer as an extrudate. The components are also mixed by operation of a blender operating at elevated temperature at high shear.

The reinforced polymers of the invention may also include conventional additives such as stabilizers, antioxidants, mold release agents, fire retardant materials and processing aids which are designed to improve the processability of the components or reinforced polymer or to improve the properties thereof. Such additives are added together with, prior to, or subsequent to, the mixing of the sized glass fibers and polymer.

A particularly useful processing aid comprises a polymer containing moieties of an $\alpha$-olefin and an $\alpha,\beta$-ethylenically unsaturated carboxylic acid which optionally may be partially neutralized with metal ions.

These materials are more fully disclosed and described at col. 3, lines 36 to col. 4, line 3 of U.S. Pat. No. 4,874,819, that portion of the disclosure which is hereby incorporated by reference. Preferred amongst this group of processing aids, however, are:

(i) copolymers of ethylene and acrylic acid commercially available as "PRIMACOR ®," a trademark of Dow Chemical Company, (ii) copolymers of ethylene and methacrylic acid commercially available as "NUCREL ®," a trademark of DuPont Company, and (iii) Zinc neutralized ionomers commercially available as "SURLYN ®,", a trademark of DuPont.

The glass fiber reinforced polyketone polymers of the invention are uniform mixtures with improved properties such as tensile strength. The reinforced polymers are therefore particularly useful where molded or otherwise shaped articles are desired which require strength. Illustrative of such applications are the production of both internal and external components and housings for automotive applications and structural parts for applications in the construction industry.

The invention is further illustrated by the following Illustrative Embodiments which should not be regarded as limiting.

ILLUSTRATIVE EMBODIMENT I

Linear alternating terpolymers of carbon monoxide, ethylene and propylene were produced employing a catalyst composition formed from palladium acetate, trifluoroacetic acid and 1,3-bis[di(2-methoxyphenyl)-phosphino]propane. The samples had limiting viscosity numbers in the 1.71 dl/g to 1.79 dl/g range.

Samples of the polymers reinforced with glass fibers containing a variety of sizing materials were produced by passing the polymer and sufficient glass fiber to produce a reinforced polymer having 30% by weight glass fiber through a Haake Buchler System 90 conical twin screw extruder. The temperature profile of the extruder ranged from 230° C. at the rear to 240° C. at the front and the die temperature was 245° C. The temperature of the polymer melt was 255° C. The extruder had a screw speed of 45 rpm and the barrel residence time was approximately 60 sec.

The samples thus produced additionally contained 2% of NUCREL ®010, a copolymer of ethylene and methacrylic acid, to serve as a processing aid.

ILLUSTRATIVE EMBODIMENT II

Samples of the reinforced polymer produced according to Illustrative Embodiment I were evaluated for tensile strength by conventional procedures. The results are shown in Table I wherein the glass fibers used are illustrated by the type of sizing the fiber incorporates. In all cases, the size had aminosilicate functionality. The other functionality is reported in Table I.

TABLE 1

| | FIBER[1] | SIZING COMPOSITION | FIBER DIAMETER [microns] | TENSILE STRENGTH [KPSI] |
|---|---|---|---|---|
| A | (PPG 3090) | EPOXY | 13 | 8.5 |
| B | (PPG 3520) | POLYURETHANE | 10 | 9.9 |
| C | (PPG 3540) | POLYURETHANE | 10 | 8.9 |
| D | (PPG 3640) | POLYURETHANE | 10 | 9.3 |
| E | (PPG 709-42-10) | POLYURETHANE/EPOXY | 13 | 9.6 |
| F | (PPG 709-45-05) | POLYURETHANE/EPOXY | 10 | 12.7 |
| G | (PPG 709-45-06) | POLYURETHANE/EPOXY | 10 | 9.3 |
| H | (PPG 709-54-10) | POLYURETHANE | 13 | 11.0 |
| I | (PPG 709-51-08) | ACRYLATE/PEROXIDE | 13 | 8.9 |
| J | (PPG 709-51-08) | ACRYLATE/PEROXIDE | 13 | 8.6 |
| K | (PPG 709-42-21) | BLOCKED ISOCYANATE | 13 | 10.9 |

[1]Conventional methods of producing and treating glass fibers are suitable for the preparation of the glass fibers useful in the practice of this invention. See in particular U.S. Pat. No. 4,615,946, in disclosure of which is hereby incorporated by reference.

ILLUSTRATIVE EMBODIMENT III

By the procedure of Illustrative Embodiment I, a reinforced polyketone polymer was prepared containing 30% by weight of a glass fiber containing a sizing agent characterized by a combination of polyurethane, aminosilane and epoxy functionality. Several mechanical properties of the reinforced polymer were determined by conventional methods and are shown in Table II, as are the corresponding values for the polymer without reinforcement (unfilled).

TABLE II

| Mechanical Properties | Unfilled | Reinforced |
|---|---|---|
| Tensile Strength, PSI | 8,500 | 12,100 |
| Elongation at Break, % | 228 | 5 |
| Tensile Modulus, KKPSI | 0.206 | 0.960 |
| Izod Impact Strength, ft-lb/in | 3.6 | 2.0 |

What is claimed is:

1. A reinforced polymer comprising a mixture of:
   (a) a linear alternating polymer of carbon monoxide and at least one ethylenically unsaturated hydrocarbon, and
   (b) 1 to 45 weight percent of a glass fiber having applied thereto a sizing material comprising an aminosilane, and a polymeric film former having polyurethane and epoxy functional groups.

2. The reinforced polymer of claim 1 wherein the linear alternating polymer is represented by the repeating formula $$-CO-CH_2-CH_2-CH_2)]_x[CO-G)]_y$$

wherein G is the moiety of the ethylenically unsaturated hydrocarbon of at least 3 carbon atoms polymerized through the ethylenic unsaturation thereof and the ratio of y:x is no more than about 0.5.

3. The reinforced polymer of claim 2 wherein y is zero.

4. The reinforced polymer of claim 2 wherein G is a moiety of propylene and the ratio of y:x is from about 0.01 to about 0.1.

5. The reinforced polymer of claim 1 wherein the aminosilane functionality is mono-, di- or triaminosilane or mixtures thereof.

6. The reinforced polymer of claim 1 wherein the polyurethane functionality is linked to the remainder of the sizing agent molecule by groups derived from ester or epoxide.

7. A reinforced polymer of claim 1 wherein said glass fiber is present in a quantity of from about 10% to about 35% by weight.

8. A reinforced polymer of claim 1 wherein said glass fiber component is about 30% by weight.

* * * * *